Fig_1a

Fig_1b

INVENTOR
RAYMOND E. FRANKS

Feb. 25, 1969

R. E. FRANKS 3,430,249

ARTIFICIAL DIELECTRIC LENS

Filed Sept. 8, 1966

INVENTOR
RAYMOND E. FRANKS

BY Harvey J. Lenhart

ATTORNEY

United States Patent Office 3,430,249
Patented Feb. 25, 1969

3,430,249
ARTIFICIAL DIELECTRIC LENS
Raymond E. Franks, San Jose, Calif., assignor to ESL, Incorporated, Palo Alto, Calif., a corporation of California
Filed Sept. 8, 1966, Ser. No. 578,007
U.S. Cl. 343—911    9 Claims
Int. Cl. H01q 15/08

This invention relates in general to dielectric lenses for focussing electromagnetic waves, and relates more particularly to such lenses for transforming a pair of substantially identical but orthogonal oriented, barrel-shaped wave fronts into a pair of plane wave fronts.

In antenna horns, which are connected to dual ridged waveguides, the horn is usually made with a sufficiently rapid taper between the waveguide section and the horn aperture so that phase correction is required at the horn aperture in order to achieve a plane wave front. With a single polarized ridged horn, the phase correction curve is different in the E plane compared with that in the H plane, and the E plane requires a greater amount of phase correction due to the presence of greater curvature. The phase front of the wave from such a horn can best be characterized as barrel-shaped, rather than being spherical as is the phase front from an ideal point source of radiation.

The prior art lenses, usually made of a dielectric material, which have been used to convert this barrel-shaped wave into a plane wave are thickest in the center, to provide a maximum retardation at this point, and then taper to zero thickness in the E plane extremities where the barrel-shaped wave has the greatest curvature. This produces a lens which is effective to correct the single polarized wave, but the resulting lens is not circularly symmetrical. Where two orthogonally polarized waves are supplied from a single horn, the lens must be symmetrical every 90 degrees to provide the same phase characteristics for both polarizations. Under these conditions, a conventional dielectric lens, as discussed above, cannot satisfy the symmetry conditions and provide unequal phase correction profiles in the E and the H planes.

In accordance with this invention, there is provided an artificial dielectric lens which is effective to provide the proper phase correction for the output wave front from a horn which is radiating two orthogonally polarized waves requiring different phase compensation. Such waves may be obtained from any suitable source, such as the dual-polarized horn described and claimed in my copending application, Ser. No. 570,973, filed on Aug. 8, 1966, and assigned to the same assignee as the present application. In the above-identified application, a quadruply ridged waveguide is employed to transmit two orthogonal polarized waves, and the horn employed is formed by gradually expanding the ridged waveguide to provide a proper impedance match with free space.

Such a horn produces two orthogonal wave fronts, each of which has a maximum curvature in its E plane and a smaller curvature in its H plane. These resulting barrel-shaped wave fronts are corrected by passing them through the dielectric lens of this invention. At any point on these two wave fronts, the electric field may be resolved into a radial $E_R$ and a circumferential (tangential) $E_T$ component. By constructing the lens so that it has a greater refraction for the circumferential component $E_T$ than for the radial component $E_R$, there will result the proper variation of index of refraction in the lens to produce the desired correction. Further, by making the geometry of the lens circularly symmetrical, both polarization states of the horn will be properly compensated.

In accordance with this invention, such a lens is constructed by distributing metallic obstacles on or within a dielectric material to produce the desired variation in the index of refraction. In the preferred embodiment of the invention, the metallic obstacles are placed in concentric rings in the dielectric, and the radial gaps between the obstacles are increased with the radial distance of the obstacle from the center of the lens. This provides a decreasing dielectric constant as a function of radial distance to provide the proper compensation for the radial component $E_R$.

Similarly, the value of the circumferential gap in each concentric ring is controlled to provide the proper dielectric constant for the circumferential component $E_T$. Further, the thickness of the lens is controlled by controlling the number of layers of obstacles therein to produce the required total phase shift.

In general, the radial and circumferential center-to-center spacings, as well as the thickness spacing between layers, may be chosen as needed to produce the desired characteristics, except the spacings should always be less than one-tenth of a wavelength so that the dielectric constant remains independent of frequency. As is well-known in the art, when the spacings between obstacles in a dielectric lens increase above one-tenth of a wavelength, the objects begin approaching resonant dimensions such that static field conditions are no longer satisfied.

Thus, the present invention provides an artificial dielectric lens which has both the rotational symmetry and the proper birefringent characteristic which is required to provide proper phase compensation for the two wave fronts.

It is therefore an object of this invention to provide an improved artificial dielectric lens for providing phase compensation for electromagnetic waves.

It is a further object of this invention to provide an artificial dielectric lens for simultaneously providing phase compensation for two orthogonal polarized waves which require a greater amount of phase correction in the E plane than in the H plane.

It is an additional object of the present invention to provide an artificial dielectric lens in which each layer of the lens is formed of a plurality of metallic obstacles arranged in concentric rings in a dielectric, the radial and circumferential separation between obstacles increasing radially of the layer to decrease the dielectric constant of the lens as a function of radius to thereby accomplish the required phase compensation without thickness variation of the lens.

It is an additional object of the present invention to provide an artificial dielectric lens for simultaneously providing phase compensation for two orthogonally polarized waves in which each layer of the lens is formed of a plurality of metallic obstacles arranged in concentric rings in a dielectric, the radial separation between obstacles in adjacent rings increasing radially at a rate different from that of the circumferential separation between obstacles to decrease the dielectric constant of the lens as a function of radius more rapidly in the E plane than in the H plane of each wave.

It is a further object of this invention to provide an artificial dielectric lens for simultaneously providing phase compensation for two orthogonally polarized waves, in which the lens is formed of a plurality of layers, each layer having a plurality of metallic obstacles arranged in concentric rings, the radial and circumferential separation between obstacles, as well as the number of layers in the lens, being varied to produce the desired variation in dielectric constant to thereby accomplish the required phase compensation.

Other objects and advantages of the present invention will be apparent from the following description when read in connection with the accompanying drawings in which.

Figure 1:
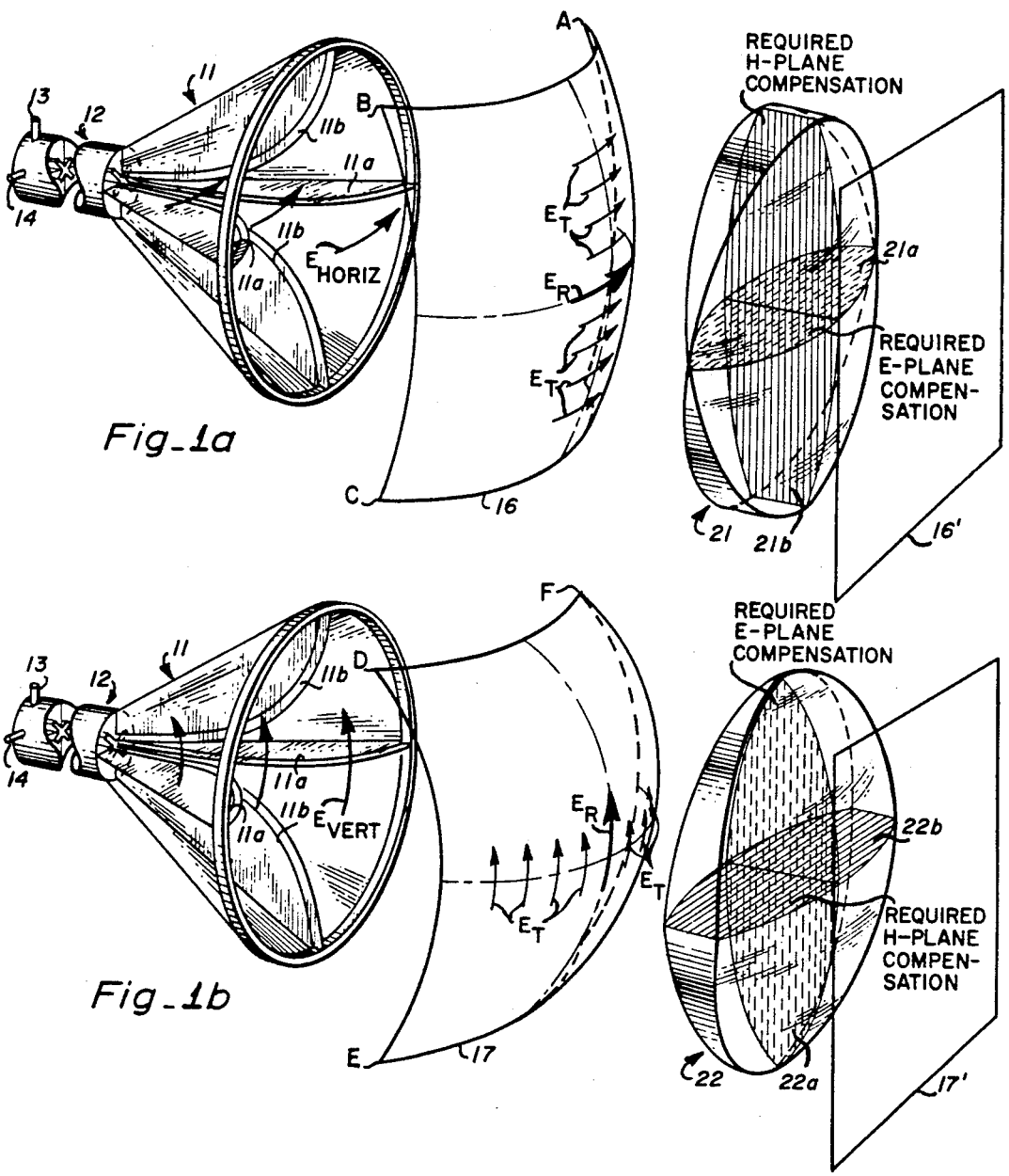
FIGURES 1a and 1b are schematic representations of the phase distorted waves produced by a quadruply ridged horn, and the dielectric lens cross sections required to provide proper phase compensation for these waves.

FIGURES 1a and 1b diagrammatically illustrate the types of wave which may be corrected by the lens of the present invention. A horn 11, which may be of the type described and claimed in my above-identified copending application, is provided with a first pair of opposed ridges 11a and a second pair of opposed ridges 11b. These ridges may be formed by expansion of the ridged waveguide structure 12, as taught in my above application, to form a radiator for two orthogonal polarized waves which may be conventionally excited in waveguide 12 by means of coaxial input lines 13, 14.

Opposed ridges 11a propagate and radiate the wave front illustrated in FIGURE 1a, while ridges 11b propagate and radiate the wave front illustrated in FIGURE 1b. Because of the relatively rapid taper between the waveguide section 12 and the aperture of horn 11, phase correction is required to obtain a plane wave front from the horn. In the absence of such correction, the radiated wave fronts have the barrel-shaped appearance indicated in FIGURES 1a and 1b.

The wave front emanating horn 11 from ridges 11a is substantially horizontally polarized and is designated by reference character 16 in FIGURE 1a. It will be seen that the curvature of this wave front in the E plane is considerably greater than its curvature in the H plane. That is, the wave front curvature between the points A–B of wave 16 is considerably greater than the curvature between the points B–C.

To provide the proper phase compensation for wave front 16, a correcting lens must have the characteristics indicated for lens 21 of FIGURE 1a. That is, in the E plane of this wave front which is the horizontal plane, the lens must have maximum thickness for retardation at the center thereof, and this thickness must decrease to zero in the extremities of the E plane where the wave has the greatest curvature. This characteristic for the E plane is indicated by cross-sectional area 21a of the lens, showing maximum thickness at the center of the lens, with this thickness decreasing to zero at the opposite edges of the lens, to produce a plane wave output 16'.

To provide phase compensation in the H plane of this wave front which is the vertical plane, the lens must have the same thickness or retardation in the center as that required for E plane compensation, but this thickness tapers to a value only about one-half that of the center at the extremities of the H plane, rather than to zero thickness as in the E plane. Such a characteristic is indicated by the cross-sectional area 21b of lens 21, this cross section being perpendicular to the cross-sectional area 21a for the E plane compensation.

The wave emanating from ridges 11b is substantially vertically polarized and is designated as 17 in FIGURE 1b. It will be seen that its curvature in the E plane is greater than its curvature in the H plane. That is, the curvature between points D–E of curve 17 is greater than the curvature between points D–F.

To provide the proper phase compensation for wave front 17, a lens must have the characteristics indicated by lens 22. Thus, in the E (vertical) plane (section 22a) the lens has a maximum thickness in the center and this thickness tapers to zero in the E plane extremities, while in the H (horizontal) plane (section 22b), the thickness in the center is the same as that for the E plane, but this thickness tapers to only about one-half its center value at the extremities of the H plane. It will be noted that the configuration of lens 22 corresponds to that of lens 21 except that it is rotated 90 degrees with respect thereto, and a plane wave output 17' is produced therefrom.

Figure 2:
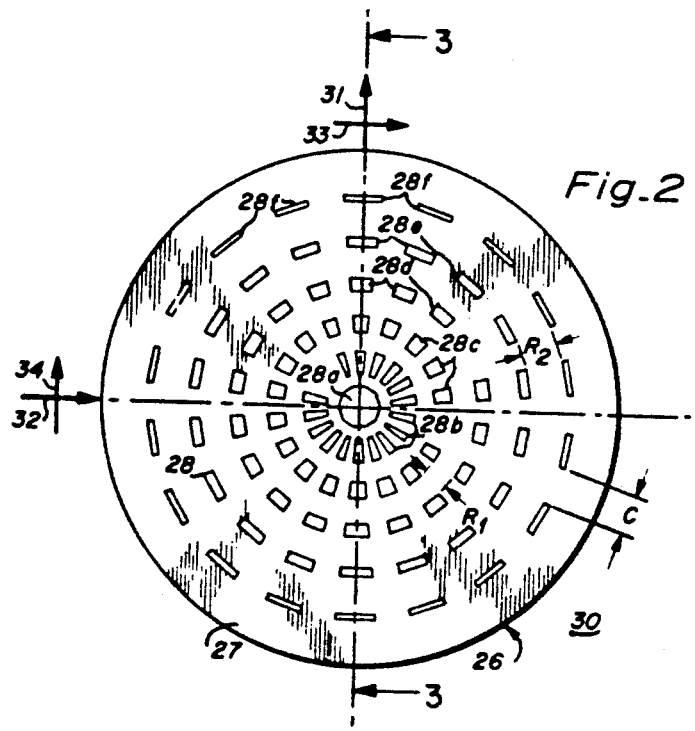
FIGURE 2 is a front view of one embodiment of an artificial dielectric lens constructed in accordance with this invention for producing the required phase compensation for the waves shown in FIGURES 1a and 1b.

To simultaneously provide the phase compensation represented by lenses 21 and 22, the lens structure 30 as shown in FIGURE 2 may be employed. This lens structure comprises a plurality of standard artificial dielectric lens layers 26 which are each formed of a thin disc 27 of a suitable dielectric material of thickness T on which are disposed a plurality of metallic obstacles 28. As shown, obstacles 28 are preferably arranged on disc 27 in concentric circles, with a single obstacle 28a at the center of the lens, a first circle of obstacles 28b surrounding this center, and a plurality of subsequent concentric circles formed by obstacles 28c, 28d, 28e and 28f.

The radial gap R between obstacles 28 increases with the radius from the lens center, as indicated by the difference in the spacing R between obstacles 28c and 28d which is $R_1$ and that between obstacles 28e and 28f which is $R_2$. This increase in obstacle spacing as a function of radius decreases the effective dielectric constant of the lens as a function of radius to provide the proper compensation for the radial field component $E_R$.

The term radial field component $E_R$, as used herein, can best be understood by referring to FIGURES 1a and 1b. Assume a vertical and a horizontal axis passing across the aperture of horn 11 and intersecting at the centerline of the horn. Assume further that the point of intersection of these two axes is the center of a circle in the plane of the vertical and horizontal axes. Now, for the horizontally polarized wave front 16, the electric field at the center of the horn will coincide with the horizontal axis and will, therefore, be along a radial line of the circle, and the electric field not at the center of the horn will intersect the vertical axis at right angles and will, therefore, be perpendicular to a radial line of the circle. The electric field coinciding with a radial line is referred to as the radial field component $E_R$, and the electric field at right angles to a radial line is referred to as the circumferential field component $E_T$. For the vertically polarized wave front 17, the radial field component is along the vertical axis, and the circumferential field component $E_T$ is perpendicular to the horizontal axis.

These fields are represented in FIGURE 2 by the different labelled vectors. Thus, vector 31 represents the radial electric field $E_R$ of wave front 17, vector 32 represents the radial electric field $E_R$ of wave front 16, vector 33 represents the circumferential electric field $E_T$ of wave front 16, and vector 34 represents the circumferential electric field $E_T$ of wave front 17.

From FIGURE 2 it will be seen that the variation in spacing R between obstacels 28 radially of the lens is effective to provide the desired decrease in dielectric constant for both of the radial fields, represented by vectors 31 and 32, of both of the orthogonal wave fronts.

In a similar manner, the circumferential gaps between adjacent obstacles 28 in a given ring are controlled to provide the proper dielectric constant for the circumferential fields represented by vectors 33 and 34. This circumferential gap C is shown for the outer ring of obstacle 28f.

Figure 3:
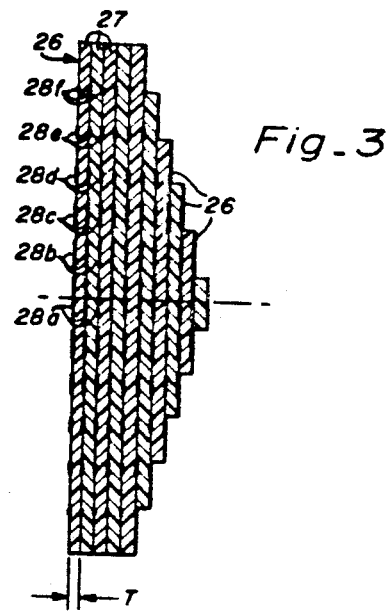
FIGURE 3 is a cross-sectional view taken along lines 3—3 of FIGURE 2 illustrating the multiple layers of construction of such a lens.

As shown in FIGURE 3, lens 30 may be made up of a number of lens layers 26 having each a thickness T. The total number of lens layers 26 and thus the total thickness of lens 30 is controlled to produce the total phase shift required to correct the wave fronts. Additionally, each of the lens layers comprising lens 30 may not necessarily be of the same diameter, as indicated by the smaller diameter layers at the rear of the lens of FIGURE 3. This decrease in the thickness of the lens with an increase of radius can be used as a design parameter to control the total phase shift produced by the lens at any given value of radius.

From FIGURES 2 and 3 it will be seen that lens structure 30 produces the same index of refraction at the center of the lens for both the radial field component $E_R$ and the circumferential field component $E_T$ such that the effective thickness of the lens at the center is the same for both polarizations. Outwardly from the center, the obstacles are unsymmetrically placed such that the index of refraction is higher for the circumferential field component $E_T$ than it is for the radial field component $E_R$. This makes the lens electrical thickness greater for $E_T$ at the outer edge, satisfying the birefringent requirement discussed above and shown schematically by the lenses of FIGURES 1a and 1b.

It will also be noted that the lens is circularly symmetrical every 90 degrees to provide the same polarization characteristics for both polarizations, thus satisfying the symmetry requirements discussed above in connection with phase compensation for two orthogonal polarized wave fronts.

The lens layer 26 may be formed of any suitable material and in any suitable manner. For example, disc 27 may be a dielectric foam having a dielectric constant near unity. Obstacles 28 may be placed on the disc 27 in any suitable manner such as by separately forming the individual obstacles and securing them at the desired places on disc 27. Alternatively, a thin metallic film may be deposited over the entire surface of the disc 27, and this film may then be selectively etched away to leave the desired metallic obstacles 28.

As indicated above, the radial and circumferential center-to-center spacings of the obstacles and the spacing T between obstacles of adjacent layers is maintained below one-tenth of a mean operative wavelength to prevent resonant effects in the structure.

As general examples of the types of structures which may be built in accordance with this invention, a lens layer may be formed with a single obstacle in the center thereof, 8 obstacles in the first ring, 16 obstacles in the second ring, 24 obstacles in the third ring etc. This produces a lens having 45-degree rotational symmetry, which is particularly suitable for use with the 90-degree orthogonal polarization planes discussed above.

However, if a lens with 60-degree symmetry is desired, for example, the lens layer may have 6 obstacles in the first ring, 12 obstacles in the second ring, 18 obstacles in the third ring, etc. The 90-degree orthogonal symmetry can be maintained, on the average, by rotating alternate lens layers through a 30-degree angle.

With respect to the general considerations involved in producing a lens in accordance with this invention, the following remarks apply. The variation with lens radius of the index of refraction for each polarization, both circumferential and radial, and the lens thickness as a function of lens radius can be determined by the required electrical path corrections that must be made in the E and H planes of the barrel-shaped phase front. A practical design is made by setting reasonable limits on the maximum and minimum values of index of refraction, N, that will be allowed in the lens for each polarization. These limits may be in the order of $$1.3 < N_{circumferential} < 1.6 \text{ and } 1.05 < N_{radial} < 1.6$$

A trial and error fitting of the selected values of N and lens thickness at each point radially to the required electrical path lengths of the two polarizations through the lens will produce a solution in which reasonable and smoothly varying values of the three variables are derived. These values of index of refraction may then be transformed into obstacle dimensions (or numbers) as a function of radius, using the detail design information available in the art, such as the text entitled "Antenna Engineering Handbook" by Jasik, McGraw-Hill Book Company, Inc., New York, 1961. Particular reference is made to section 14.6 of that text which considers the above-mentioned three variables of artificial dielectric lenses in connection with the design and construction of rectangular arrays of metallic obstacles. These considerations are equally applicable to the design and construction of the dielectric lens of this invention.

Generally speaking, and by way of summary, the three principal variables are the radial gap spacing, the circumferential gap spacing and the number of overlying or stacked obstacles which determine the thickness of the lens. Each of these may vary as a function of the lens radius. Whereas the thickness of the lens varies the index of refraction for both the radial and the circumferential electric field, the radial gap spacing primarily varies the index of refraction for the radial electric field and the circumferential gap spacing primarily varies the index of refraction for the circumferential electric field. Accordingly, the lens of the present invention may be constructed by increasing the radial gap spacing with increase of radius and by increasing the circumferential gap spacing with increase of radius and by decreasing the lens thickness with increased radius. While it is always necessary in a lens for correcting a barrel-shaped lens to increase the radial gap spacing with increase of radius because of the higher required variation of the radial index of refraction, the thickness may be kept constant by increasing the circumferential gap spacing or vice versa.

By way of example, the parameters of a lens constructed in accordance with this invention will now be given. The lens was designed for operation with a quadruply ridged waveguide horn having an aperture diameter of 30 inches and a horn taper length of 40 inches which was to operate over a frequency range from 200 mHz. to above 3000 mHz. Without a lens, the directive gain of the horn was found seriously reduced by aperture field phase curvature at frequencies above 800 mHz. More particularly, it was found that the wave fronts were barrel-shaped with a maximum curvature of 4 inches in the E plane and 3 inches in the H plane. The lens constructed in accordance with the present invention to correct the wave front was 30 inches in diameter and comprised 19 layers of metallic obstacles formed by printed circuit techniques on aluminum-clad Mylar sheets. Polystyrene foam spacers were used between layers to maintain a layer spacing of 0.375 inch (for reasons described in the above-referenced text). Seven layers were of reduced diameter such that the lens was 6.75 inches thick in the center and 4.5 inches thick at the outer diameter.

All lens layers were alike, except for the outside diameter, and were constructed on the 60-degree symmetry principle. Each lens layer contained six obstacles in the first ring, twelve in the second, etc. The obstacle spacing was made with a nominal center-to-center obstacle spacing of 0.40 inch radially and 0.40 ($\pi/3$) inch circumferentially. The circumferential gaps between obstacles were constant at 0.040 inch throughout the layer for ease of layout of the obstacle pattern. The radial gaps were made in accordance with the following table.

| Radial distance to inner boundary of gap in inches: | Radial gap in inches |
|---|---|
| 0.2 | 0.040 |
| 0.6 | 0.040 |
| 1.0 | 0.040 |
| And consecutive values in 0.4 inch increments up to 6.2 inches. | |
| 6.2 | 0.040 |
| 6.6 | 0.041 |
| 7.0 | 0.043 |
| 7.4 | 0.045 |
| 7.8 | 0.047 |
| 8.2 | 0.050 |
| 8.6 | 0.053 |
| 9.0 | 0.056 |
| 9.4 | 0.060 |
| 9.8 | 0.065 |
| 10.2 | 0.071 |
| 10.6 | 0.078 |
| 11.0 | 0.086 |
| 11.4 | 0.095 |
| 11.8 | 0.105 |
| 12.2 | 0.117 |
| 12.6 | 0.130 |
| 13.0 | 0.144 |
| 13.4 | 0.160 |
| 13.8 | 0.180 |
| 14.2 | 0.220 |
| 14.6 | 0.250 |
| 15.0 | (¹) |

¹ Outer boundary of layer.

The diameters of the layers of the lens were chosen according to the following table in order to give the proper variation of lens thickness from 6.75 inches in the center to 4.5 inches at the outer edge of the lens:

| Layer number: | Diameter of layer in inches |
|---|---|
| 1 (nearest horn) | ¹ 30 |
| 2 through 12 | 30 |
| 13 | 26 |
| 14 | 23 |
| 15 | 20 |
| 16 | 18 |
| 17 | 16 |
| 18 | 14 |
| 19 | 8 |

¹ Full diameter of obstacle pattern.

This lens was constructed and tested with the quadruply ridged waveguide horn. Phase front measurements and antenna radiation pattern measurements made with the lens both showed that the lens transformed the barrel-shaped wave front emanating from the horn into a substantially plane wave front.

Of course, instead of increasing the index of refraction at the center by utilizing a plurality of smaller diameter lens layers, the same effect could have been obtained by providing for a variation of the circumferential gap distance which was maintained constant, and decreasing the radial gap variation to offset the effect at the center.

There has been described an artificial dielectric lens which will refract a barrel-shaped wave front into a plane wave front and which has 90° symmetry. The lens has three primary parameters which are the radial gap spacing, the circumferential gap spacing and the overall thickness of the lens.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. An artificial dielectric lens for providing phase compensation for electromagnetic waves comprising:
at least one disc of dielectric material of substantially uniform thickness having a dielectric constant near unity;
a plurality of metallic obstacles on said dielectric disc, said obstacles being arranged on said dielectric disc in concentric rings with one of said obstacles in the center of said disc; and
the radial spacings between said metallic obstacles increasing radially of said dielectric disc to decrease the effective dielectric constant of said lens for the radial component of the electromagnetic waves as a function of the radius of said lens.

2. An artificial dielectric lens in accordance with claim 1 in which said metallic obstacles are symmetrically disposed on said dielectric disc with respect to selected diametrical planes.

3. An artificial dielectric lens in accordance with claim 1 in which said metallic obstacles are symmetrically disposed on said dielectric disc with respect to a pair of orthogonal diametric planes.

4. An artificial dielectric lens in accordance with claim 1 in which the circumferential spacing between said metallic obstacles increases radially of said dielectric disc to decrease the effective dielectric constant of said lens for the circumferential component of the electromagnetic waves as a function of the radius of said lens.

5. An artificial dielectric lens in accordance with claim 1 in which a plurality of dielectric discs are axially aligned to form said lens, and in which selected ones of said discs include a lesser number of concentric rings of metal obstacles than certain other discs, and in which the obstacles in those concentric rings which are included in said selected discs are in alignment with corresponding obstacles in corresponding concentric rings on said certain other discs.

6. A artificial dielectric lens in accordance with claim 5 in which said selected ones of said discs include only a selected number of inner concentric rings of metal obstacles to effectively increase the dielectric constant at the center of said lens.

7. An artificial dielectric lens in accordance with claim 1 in which a plurality of dielectric discs, each including the identical arrangement of metallic obstacles, are axially stacked to form said lens, and in which the diameter of said plurality of dielectric discs decreases axially along said stack, in steps, to increase the effective dielectric constant of said lens for both the radial and the circumferential component of the electromagnetic waves as an inverse function of the radius of said lens.

8. An artificial dielectric lens for converting a pair of orthogonally plane polarized electromagnetic waves having substantially identical barrel-shaped wave fronts with a common center to planar wave fronts, said lens comprising:
a plurality of axially aligned lens layers;
each lens layer including a disc of dielectric material of uniform thickness having a dielectric constant near unity and a plurality of metallic obstacles disposed on said discs, said obstacles being arranged on said dielectric disc in concentric rings with one of said obstacles in the center of said dielectric disc, the radial gap spacing between adjacent ones of said obstacles being alike for all lens layers and increasing as a function of the radius of said disc to decrease the effective dielectric constant of said lens layer as a function of said radius for the radial component of electric field of the electromagnetic waves; and
the number of outer concentric rings of metallic obstacles about the center obstacle on certain ones of said lens layers being smaller than on others to increase the effective dielectric constant of said lens at the center thereof for the circumferential component of the electric field of the electromagnetic waves.

9. An artificial dielectric lens in accordance with claim 8 in which the circumferential gap spacing between adjacent ones of said obstacles is alike for all lens layers and increases as a function of the radius of said discs to decrease the effective dielectric constant of said lens layer as a function of said radius for the circumferential component of the electric field of the electromagnetic waves.

References Cited
UNITED STATES PATENTS 3,329,958  7/1967  Anderson _____ 343—753

ELI LIEBERMAN, *Primary Examiner.*